United States Patent

[11] 3,614,583

| [72] | Inventors | Wilford B. Burkett<br>Pacific Palisades;<br>Robert V. Jackson, Los Angeles, both of Calif. |
|---|---|---|
| [21] | Appl. No. | 867,838 |
| [22] | Filed | Oct. 20, 1969 |
| [45] | Patented | Oct. 19, 1971 |
| [73] | Assignee | McCulloch Corporation<br>Los Angeles, Calif. |

[54] RAPID CHARGING OF BATTERIES
33 Claims, 11 Drawing Figs.

[52] U.S. Cl............................................... 320/5,
320/14, 320/20, 320/21, 320/22, 320/44
[51] Int. Cl.................................................. H02j 7/10
[50] Field of Search............................................. 320/DIG.
12, 4, 22–24, 39, 40, 35, 36, 46, 5, 20, 21

[56] References Cited
UNITED STATES PATENTS

| 1,126,667 | 1/1915 | Wilson | 320/14 |
|---|---|---|---|
| 1,126,670 | 1/1915 | Wilson | 320/14 |
| 2,366,466 | 1/1945 | Amsden | 320/34 |
| 2,503,179 | 4/1950 | Tichenon | 320/14 |
| 2,619,624 | 11/1952 | Briggs, Jr. | 320/14 |
| 2,637,836 | 5/1953 | Kendall et al. | 320/24 |
| 2,752,550 | 6/1956 | Beer | 320/4 |
| 3,454,860 | 7/1969 | Burkett et al. | 320/DIG. 2 |
| 3,487,284 | 12/1969 | Cady | 320/DIG. 2 |
| 3,500,167 | 3/1970 | Applegate et al. | 320/14 |
| 3,517,293 | 6/1970 | Burkett et al. | 320/39 X |

FOREIGN PATENTS

| 809,148 | 2/1937 | France | 320/4 |
|---|---|---|---|
| 1,432,524 | 2/1966 | France | |
| 957,492 | 5/1964 | Germany | |

OTHER REFERENCES

The Effect of Applying a Counter E.M.F. to a Le Clanche Cell, Creighton, Vol. 73 pps. 587– 601, Trans-Electrochemical Soc., 1938

Dry Cells Can Be Reactivated, Hallows Radio-Electronics pp. 49, 1956

Primary Examiner—J. D. Miller
Assistant Examiner—John M. Gunther
Attorney—Christie, Parker & Hale ABSTRACT: Batteries, having one or more cells, are charged by applying a charging current, either continuous direct current or pulsating direct current, having an average value during flow in excess of the nominal 1 hour rate of the cells as rated by the manufacturer. The batteries are intermittently discharged to depolarize the battery to enhance the chargeability of the battery. This discharging is at a rate also in excess of the nominal 1 hour rate, with the occurrence of the discharging being dependent upon the occurrence of a selected value of either battery terminal voltage, battery pressure, or battery temperature, one of which is monitored.

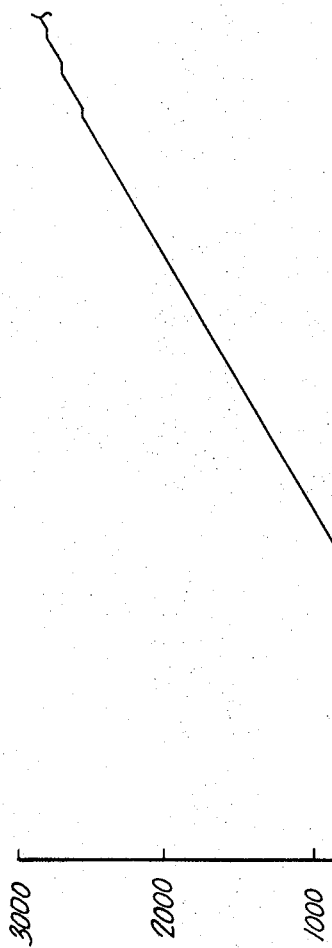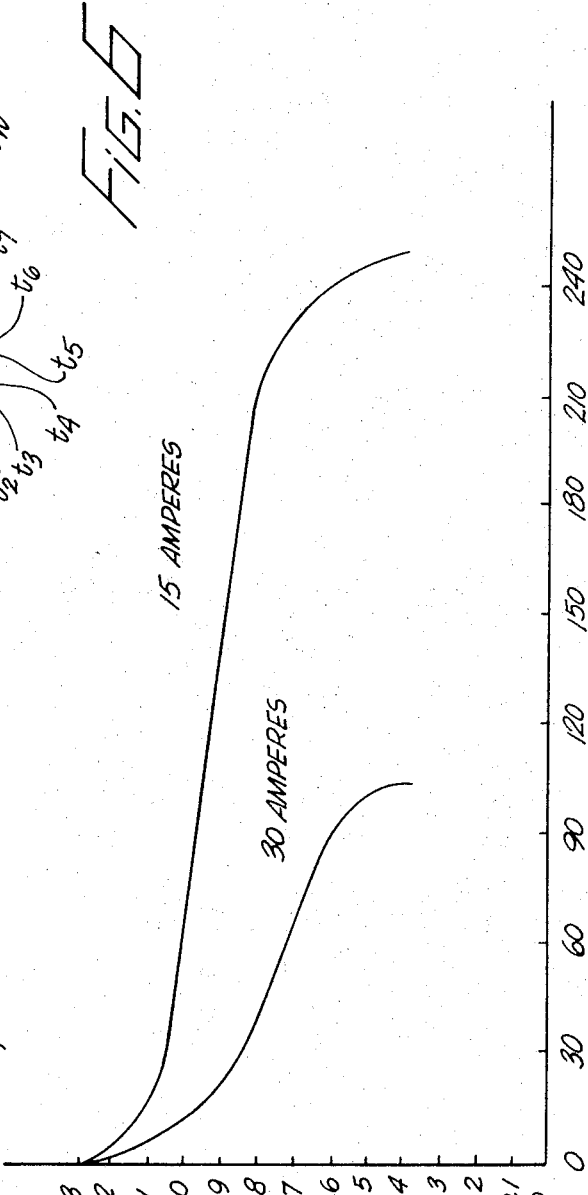

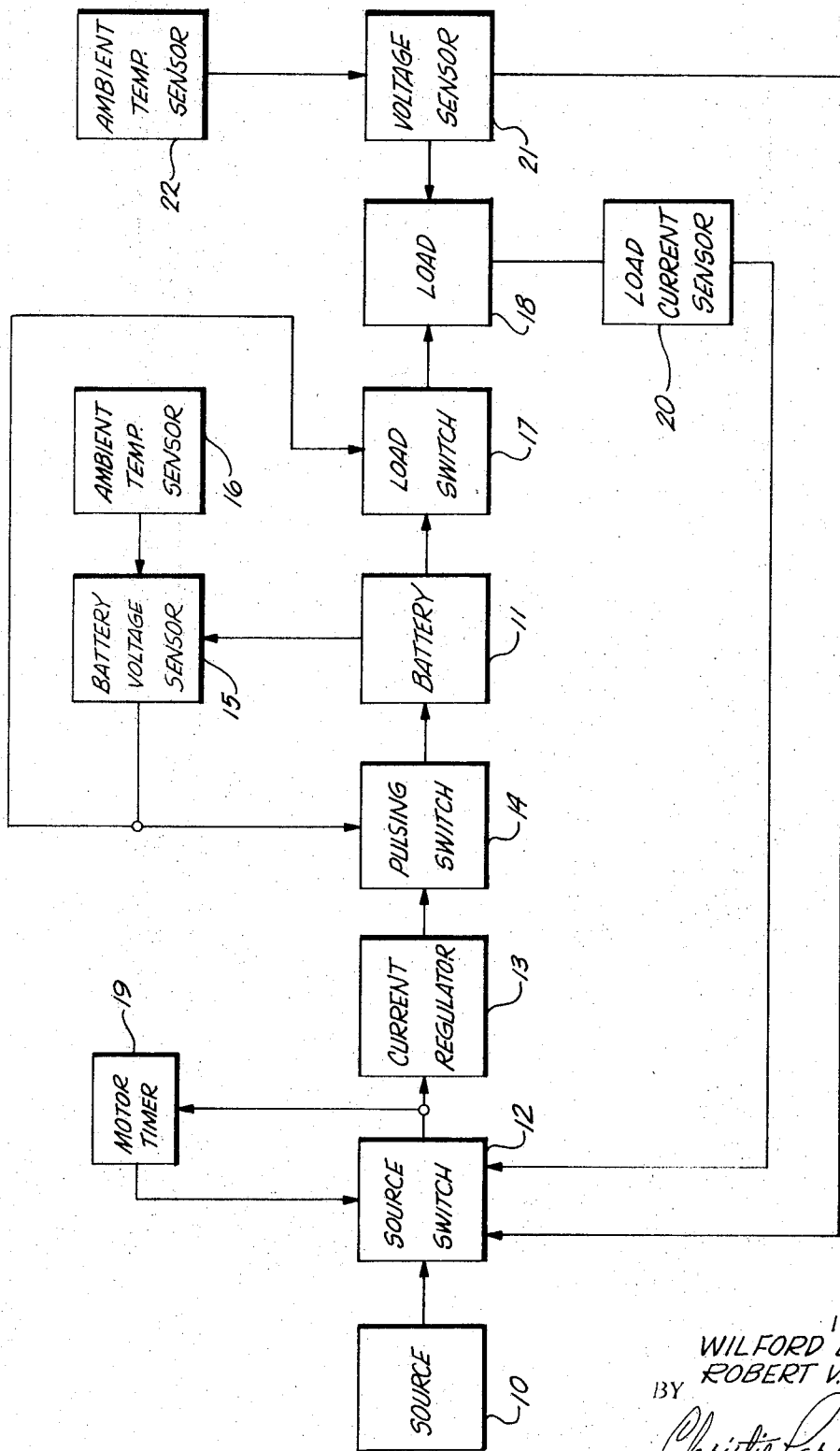

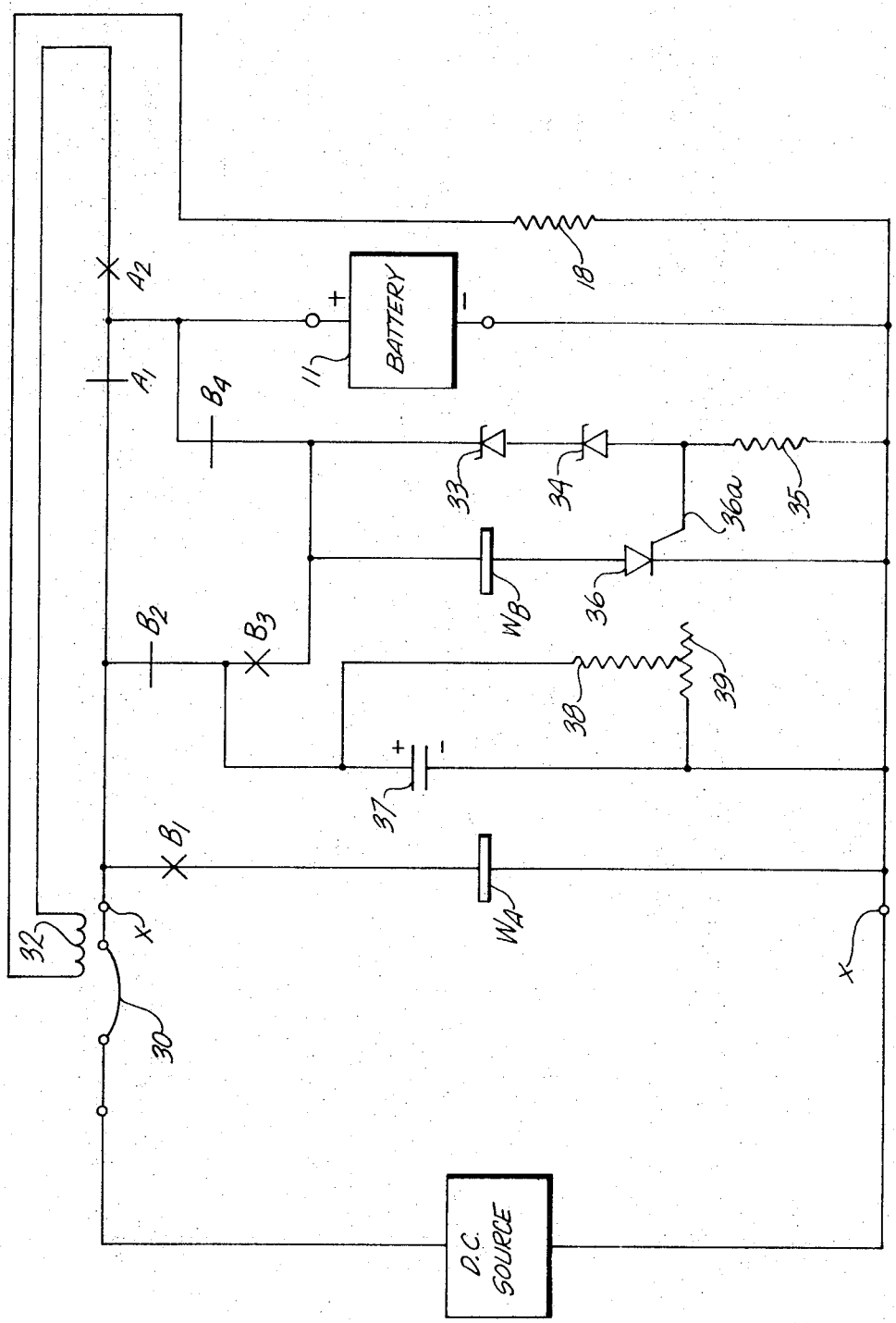

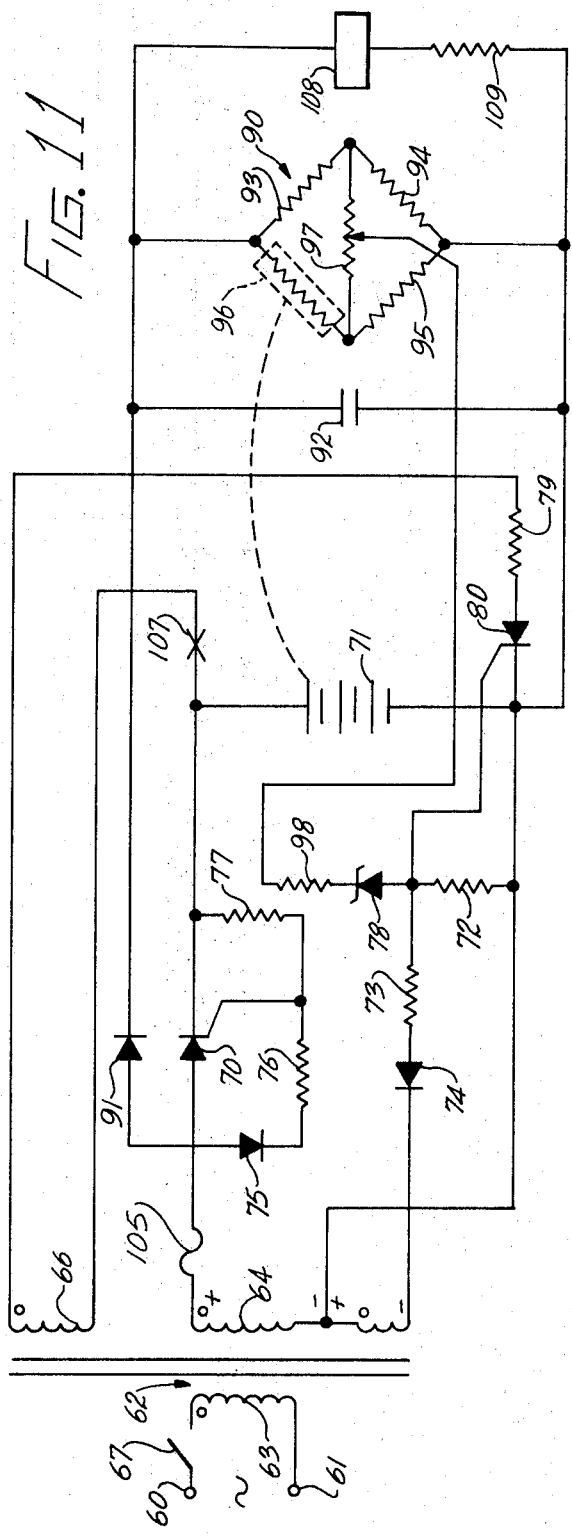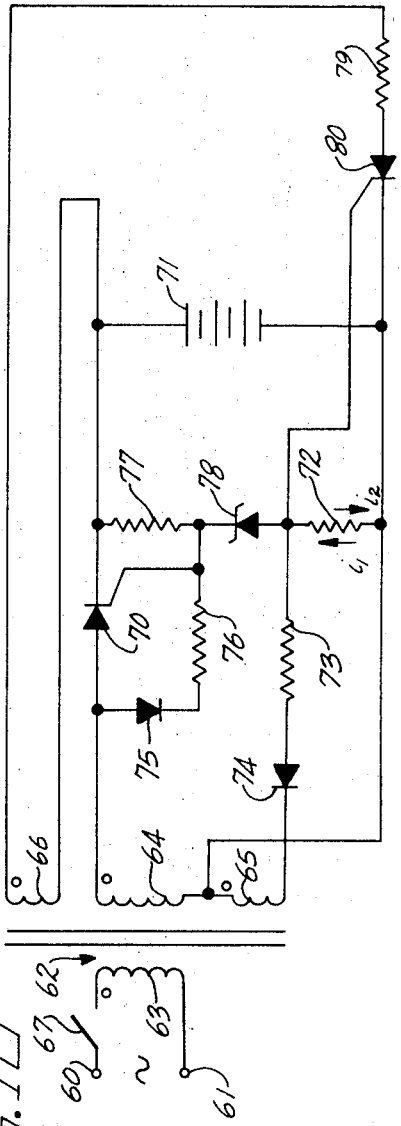

RAPID CHARGING OF BATTERIES

CROSS-REFERENCE TO RELATED APPLICATION

This application is a continuation-in-part of our application Ser. No. 612,995, filed Jan. 31, 1967, entitled "Rapid Charging of Batteries" and assigned to the same assignee as the present application, and is related to the concurrently filed application Ser. No. 870,402 which is also a continuation-in-part of our application Ser. No. 612,995, now U.S. Pat. No. 3,517,293, and is assigned to the assignee of the present application.

BACKGROUND OF THE INVENTION

Field of the Invention

This invention relates to a method and circuit for quick-charging batteries, and is particularly adapted to the charging of batteries in a minimum amount of time.

Batteries are employed more and more as the power source for all types of devices including many portable devices and stationary devices. For example, batteries are presently again being considered for powering automobiles. Batteries already power both large and small devices, for example, golf carts in the category of large devices, and toothbrushes and miniature hearing aids in the category of smaller devices. Batteries are also the source of power for the many cordless appliances on the market. However, many more cordless appliances and other battery-powered devices would be in use and some of those in use, could use smaller batteries, if it was not for the long period of time required to charge the batteries. Furthermore, those in use would be more useful but for the charging limitations.

Known methods and apparatus for charging electric batteries involve excessively long periods of time, and when attempts are made to shorten the time period, involve excessive gas generation and increase in battery temperature. While gas generation and increase in temperature with a resultant increase in pressure, while not desirable, may be permissible for some vented rechargeable batteries, they could easily cause distortion of a sealed battery, such as a battery comprised of nickel-cadmium cells. Limiting factors in the charging of any cells, and particularly in the charging of sealed cells, is the amount of gas generated and the degree of temperature rise during the charging process. These, in turn, generally limit the rate at which charging of the cells can be executed so that considerable time is required for charging the battery before the battery can be put to use again in the device to which it supplies power.

A typical example is the cordless electric drill that often employs a sealed nickel-cadmium cell of the type C capacity. The recommended time in which to charge these cells varies between two hours and sixteen hours. For example, one of the manufacturers of this type of cell recommends that it be charged for sixteen hours at a constant current rate of 150 milliamperes, which is one-tenth of C, C being the nominal rate of discharge current for 1 hour to a selected end voltage such as 1 volt per cell, or in short, the nominal 1-hour rate of the cell as established by the manufacturer thereof. A type C cell is normally rated at 1.5 ampere-hours and, thus has a C rate of 1.5 amps. These data are set out in the catalog entitled "-General Electric Rechargeable Sealed Nickel-cadmium Batteries" [Catalog No. GEA 7678A].

However, when the equipment being powered by a battery source is being used in a production line, a barber shop, or in a home, it is generally not acceptable to set the equipment aside to wait 16 hours for the battery to be charged before the equipment can again be placed in use.

SUMMARY OF THE INVENTION

Thus, in accordance with the present invention batteries are charged in a very short time by employing the method that comprises the steps of applying a charging current having a magnitude in excess of the nominal 1-hour rate of the cells that make up the battery, and intermittently discharging the battery at a rate in excess of the nominal 1-hour rate to depolarize at least some of the elements of the battery. While charging progresses the change in one of the parameters of the battery is sensed, the parameters that change are the voltage, the internal pressure, and the temperature. In response to the occurrence of a selected value in the sensed parameter, the battery is discharged at a rate in excess of the nominal 1-hour rate of the cells of the battery, during at least a portion of a discharge interval either with or without a concurrent interruption in the application of charging current. Thereafter, the steps are repeated for a selected period of time or until the cell reaches a desired level of charge. By employing this method it is possible to charge batteries in a very short period of time, for example, in the order of 10 to 20 minutes.

Further, in accordance with the present invention, batteries are charged in a very short time by employing an apparatus for charging that comprises a source of direct current charging current, a discharge path, and means for sensing a parameter of the battery, such as the voltage, temperature, or pressure to selectively apply the discharge path. Additionally, the apparatus may include means for interrupting the charging current when interruption is desirable, such as, for example, when the charging current is continuous direct current.

The battery charger may also include means for compensating for ambient battery temperature and component temperatures above or below the normal temperatures at which the battery is rated and the components calibrated to operate. For temperatures below the normal operating temperature of the battery the discharge path is applied less frequently to allow the battery to charge to a higher voltage. Conversely, at temperatures above the normal operating temperature the battery is charged to a lower voltage. In this regard, an ambient temperature sensor is employed and connected to or made a part of the means for sensing the variable battery parameter. The ambient voltage sensor makes the sensing means and therefore the discharge path-applying means and the interrupting means sensitive to higher levels at ambient temperatures below the normal battery temperature and to lower levels at temperatures above the normal battery temperature. The sensor may be responsive to either the ambient temperature of the battery or the ambient temperature of the environment of both the battery and the charger.

The battery may be charged for a selected period of time by either manually shutting the charger off or by employing a timer that drives a motor that is mechanically connected to the off switch for the charger.

Alternatively, the battery may be charged to a selected magnitude of charge and the charger thereafter turned off automatically as disclosed in the copending, concurrently filed application Ser. No. 870,402.

BRIEF DESCRIPTION OF THE DRAWING

The above and other features and advantages of the present invention may be understood more clearly and fully upon consideration of the following specification and drawings, in which:

FIG. 4 is a curve showing the energy put into the battery during a charging interval and the energy removed during a discharging interval in accordance with the present invention;

FIG. 5 is a block diagram of an apparatus for charging a battery in accordance with the method for rapid charging in accordance with the present invention;

FIG. 6 is a chart showing two discharge curves of a typical sealed nickel-cadmium cell;

FIG. 7 is a schematic diagram of a preferred embodiment of the battery charger in accordance with the present invention;

FIG. 10 is a schematic circuit diagram of an arrangement for rapid charging a battery from a source of alternating current; and FIG. 11 is a schematic circuit diagram of an alternative arrangement to that of FIG. 10.

DESCRIPTION OF THE PREFERRED EMBODIMENTS

Figure 1:
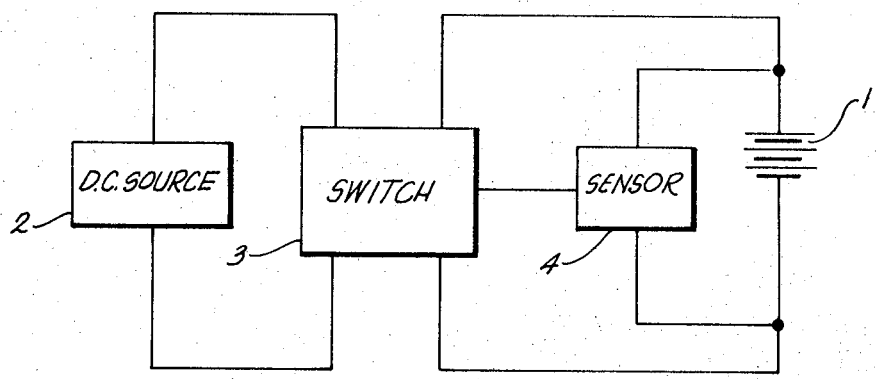
FIG. 1 is a block diagram of an apparatus for quick-charging a battery in accordance with the present invention.

In the majority of the applications where batteries are employed as the power source, it is desirable to charge the batteries in the shortest possible time. A block diagram of a preferred circuit for charging a battery 1 in a very short period of time is shown in FIG. 1. The circuit includes a direct current voltage source 2, which may include, for example, an alternating current generator with a rectifier and filter across the output terminals. This source 2 may supply either continuous or pulsating direct current charging current. The output of direct current voltage source 2 is applied to the battery 1. In the case of continuous direct current, a pulsing switch 3 may be connected between the source 2 and the battery 1.

The present invention will be described by using a typical Sub-C sealed nickel-cadmium cell, as an example, but it is to be understood to be applicable to the charging of any cell or any battery employing a plurality of secondary cells as well as other rechargeable electrochemical power sources. A Sub-C nickel-cadium cell, such as the one used in battery 41B001KD 06 manufactured by The General Electric Company has a nominal voltage of 1.2 volts per cell, and the nominal capacity of 1 ampere hour based upon a "C" rate or a discharge current of 1 ampere to an end voltage of one volt. The manufacturer recommends that this cell be charged at a C/10 rate or at 100 milliamperes for a period of 16 hours. This time is excessive as this cell can be charged in considerably less time that the recommended 16 hours by employing the method of the present invention.

The method of the present invention of quick-charging such a sealed cell can be advantageously employed to charge the cell to rated capacity in approximately 20 minutes or less. A cell may have an effective capacity different from is rated capacity which effective capacity may be greater or less than the rated capacity depending upon the condition of the cell.

All secondary cells, in general, have a certain charge efficiency, which is a measure of the amount of usable energy out of the cell for a given amount of energy put into the cell. For example, a typical Sub-C sealed nickel-cadmium cell has a rated capacity of 1.0 ampere-hours at a discharge rate of 1 ampere for 1 hour. The rated capacity and the usable energy available is considerably less for higher discharge rates. If 80 percent of the rated capacity or 2,880 ampere-seconds are put back into a completely discharged Sub-C cell and the cell thereafter delivers 2,592 ampere-seconds, its charge efficiency would be 90 percent.

By employing the method of the present invention it is possible to get a very high charge efficiency and to charge the cell in a very short period of time.

Figure 2:
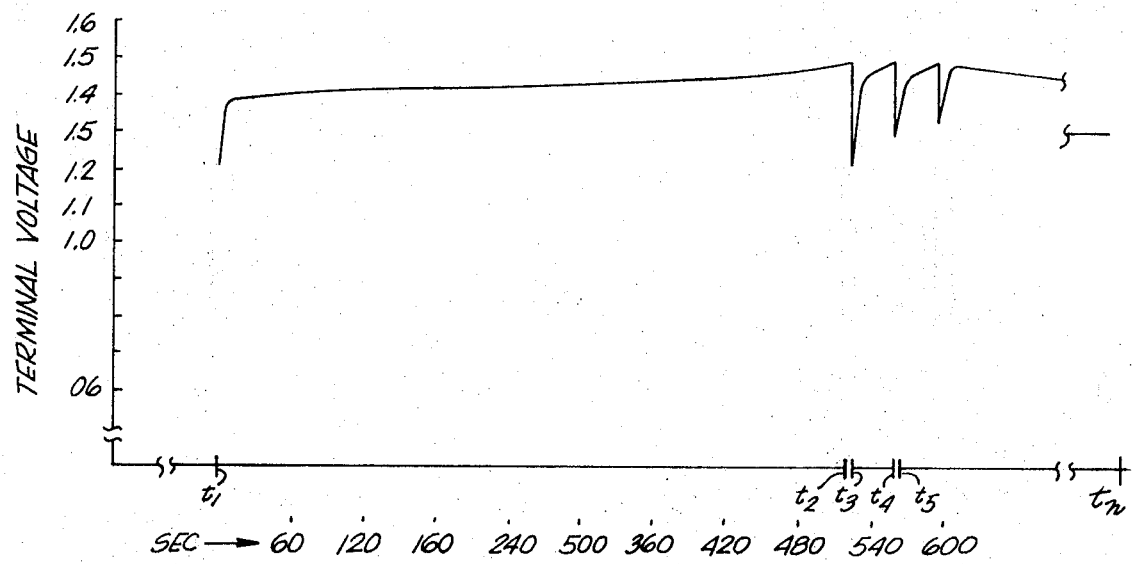
FIG. 2 is a curve showing the terminal voltage of a battery being charged in accordance with the present invention.
Figure 3:
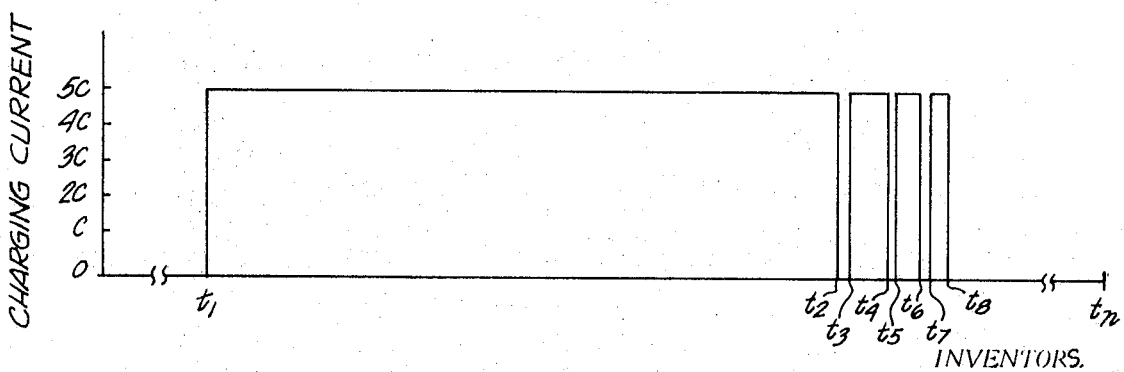
FIG. 3 is a curve showing the charging current and which is intended to be illustrative of the charge interval - discharge interval relationship in accordance wit the present invention.

The voltage at the terminals of the cell, the charging current applied to the cell, and the energy put into the cell for a typical Sub-C sealed nickel-cadmium cell being quick-charged in accordance with the method of the present invention are shown in FIGS. 2, 3, and 4, respectively, The charts in these figures are all on the same time base, which time base is shown in FIG. 2.

Referring to FIG. 3, which is intended to be illustrative of the charge interval-discharge interval relationship, the charging current is applied at a selected rate in excess of the nominal 1-hour rate of the battery and ideally at the optimum rate for charging the battery. The optimum rate is dependent upon the initial charge condition of the cell, the age of the cell, and the internal construction of the cell. For example, some cells have higher internal resistances than others and consequently excessive heat may be generated if too high a charge rate is employed. It is believed that the optimum charge rate will restore the most usable energy in the cell in the shortest amount of time.

As an example, the apparent optimum rate for charging the Sub-C cell used in the General Electric battery 41B001KD06 appears to be approximately 5 amperes or five times C. There is believed to be an optimum charging current for each category of cell, the categories generally being established by the rated capacity of the cell, which is dependent upon the size of the cell, the composition of the cell, and the amount of usable active material in the cell,.

A limiting factor in the charging of any cell and particularly in charging sealed cells, is the amount of gas generated during the charging process. In nickel-cadmium cells for example, a critical factor is generally the evolution of hydrogen gas, since the oxygen that evolves at the positive nickel electrode during the charging process readily reacts with the negative cadmium electrode and generally there is an excess of active negative material so that the evolution of oxygen alone is generally not a limiting factor.

In the method of the present invention the discharge path is applied to depolarize the battery and the charging current may be removed or interrupted, if necessary, when one of the parameters that varies during the charging of the battery reaches a selected value. The parameters of the battery that vary during the charging are the terminal voltage, the internal pressure, and the temperature of the cell. For example, a voltage change results across the terminals of a sealed nickel-cadmium cell as the electrodes change during the charging process. This voltage change may be monitored in accordance with the method of the present invention to prevent cell failure.

A sensor, such a sensor 4 of FIG. 1, is connected to monitor the battery terminal voltage parameter, and the charging current is interrupted in response to the occurrence of a selected voltage below the voltage at which excessive gassing generally takes place. In addition to the interruption of the charging current the battery is discharged at a high rate to enhance the chargeability of the battery at high rates. The battery may be discharged in response to the occurrence of a selected voltage without an interruption of the charging current. This is especially true, where the charging current is pulsating direct current and the discharging takes place during a period of time when the source voltage is less than the battery terminal voltage and no charge current is flowing.

In a typical Sub-C cell excessive gassing started to take place at a terminal voltage in excess of 1.5 volts at usual room temperature or approximately 70° F. Therefore, in accordance with the method of the present invention the terminal voltage is monitored, and before it exceeds the critical value of 1.5 volts the discharge path is applied and/or the charging current is interrupted. This is shown in FIG. 2 which is a curve of terminal voltage versus time with the charging current initially applied at time $t_1$. The charging current curve is shown in FIG. 3 and has the same base as the terminal voltage curve of FIG. 2. The curves of FIGS. 2 and 3 are curves that were produced during the charging of an actual Sub-C cell and are therefore representative of typical curves produced when quick-charging cells in accordance with the method of the present invention.

The cell of FIG. 2 was substantially completely discharged and had a terminal voltage with the load applied of approximately four-tenths of a volt as compared to the fully charged terminal voltage of approximately 1.3 volts. With the load removed, and after a period of time the terminal voltage with no load drifted back up to approximately 1.23 volts where it remained. Thus, the terminal voltage was approximately 1.23 volts when the charging current was first applied at time $t_1$. A charging current of 5 amperes or five times C was applied as shown in FIG. 3. As seen from FIG. 2, the terminal voltage rises quickly upon the application of a charging current and levels out and thereafter increases slowly as the energy is restored in the cells.

When the terminal voltage increases to the selected value of 1.5 volts the discharge path is applied and the charging current is interrupted. This time is shown as time $t_2$ on the curves of FIGS. 2 through 4. It is believed to be desirable when charging from a source of continuous direct current that during this initial application of continuous charging current to restore as much energy in the cells as possible. It has been found that by employing the high charging current at least 35 percent of the total energy can be restored during the initial application of charging current. This is shown in FIG. 4, which is a curve showing the energy put in during each charge interval and removed during each discharge interval. During the time between $t_1$ and $t_2$ approximately 2,600 ampere seconds were put into the type Sub-C cell, which is approximately 87 percent of the rated capacity of the cell at a discharge rate of five times C.

In the method of quick-charging the application of a load to the cell or the reversal of the current through the cell increases the amount of charge the cell will accept. The cell is discharged at a high rate, for example, at a rate of 20 amperes for a short period of time, which period of time for the cell of FIGS. 2 and 3 was 3 seconds. The shorter the time in which the discharge takes place the sooner the charging current can be reapplied and the full charge of the cell can be reached.

During this discharging period some work has to be done so that there is a limitation on the shortness of the period. In FIG. 4 it is seen tat between times $t_2$ and $t_3$ a small amount of energy is removed from the cell during this period. It is believed that the discharging of the cell depolarizes the electrodes and electrolyte to permit faster charging. Also the depolarizing appears to prevent the formation of gases that could be formed during each charging pulse. The greater the discharge current the shorter the period of time required to prepare the cell for the next pulse of charging current.

At the end of the discharging period, which is indicated on the curves of FIGS. 2 through 4 as time $t_3$, the high charging current is again applied to more fully charge the cell. The high charging current is applied to the cell until the terminal voltage again reaches the selected value at which point the discharging step is again undertaken and the charging is interrupted. The steps are repeated until the desired amount of charge is restored in the cell or until the cell is completely recharged or for some selected period of time.

A battery charger for quick-charging a cell or a battery from a continuous direct current source in accordance with the present invention is shown in FIG. 5 in block form. The charger will be described in connection with a battery, which is, of course, comprised of one or more cells, but it is to be understood that the charger may also be used for charging other rechargeable electrochemical power sources.

The battery charger of FIG. 5 includes a source 10 that provides a continuous direct current charging current for the battery. The source 10 may be a direct current generator or a battery. In any case, the source 10 is coupled to the battery 11 through a source switch 12, a current regulator 13, and a pulsing switch 14. The current regulator 13 may be omitted from the battery charger and the source coupled directly to the pulsing switch 14 through the source switch 12.

A battery voltage sensor 15 is directly coupled to the battery 11 to monitor the terminal voltage across the battery as the battery is charged. The battery voltage sensor 15 is coupled to the pulsing switch 14 so that the pulsing switch 14 will operate before the terminal voltage across the battery reaches the critical value above which excessive gassing may take place in the battery. Therefore, the terminal voltage parameter of the three parameters of the battery that vary during the charging of the battery is being monitored. However, the internal pressure or the temperature may alternatively be monitored to control the operation of the pulsing switch 14 as more fully discussed below.

The accuracy of the charger may be maintained over a wide range of temperatures by employing an ambient temperature sensor 16 to control the voltage at which the battery voltage sensor 15 will cause the pulsing switch 14 to operate. Batteries are generally rated for operation at room temperature, or at 70° F. Above this temperature the battery will charge more rapidly than it will below this temperature. Therefore, the ambient temperature sensor 16 will cause the charger to shut off sooner at higher temperatures by making the battery voltage sensor 15 responsive to lower terminal voltages, and conversely, the ambient temperature sensor 16 will make the charger remain on for a longer period of time at lower temperatures by making the battery voltage sensor 15 responsive to higher voltages at the lower temperatures. The sensor 16 is preferably placed next to the battery so that it senses the battery temperature. If the battery and charger are at the same temperature in a common environment, then the sensor need only sense the ambient temperature of the surrounding environment.

As an example of a usage of a battery wherein the battery will be subjected to temperature extremes is where the battery is employed to power military communications equipment. This equipment may be used during the winter, thereby subjecting the battery to temperatures even below the freezing point and also it may be employed in jungles or during the summer months thereby subjecting the battery to temperatures higher than the normal temperatures at which the batteries are rated.

The charger of FIG. 5 further includes a load switch 17 between a load 18 and the battery 11. The load switch 17 couples the load 18 to the battery 11 at the end of the pulse of the charging current in response to the battery voltage sensor 15 and the occurrence of a selected value of terminal voltage across the battery. The load 18 therefore provides a discharge path across the battery and will discharge the battery 11 to depolarize the electrodes and electrolyte so that the battery may be further charged and at a faster rate.

The charging of the battery 11 may be ended after a selected period of time or by monitoring the charge condition of the battery as discussed in the above-mentioned copending concurrently filed application.

A specific embodiment of the battery charger of FIG. 5 is shown in schematic form in FIG. 7. The direct current source 10 is coupled to the battery 11 through a source switch 12 which is essentially a circuit breaker with a movable contact 30 responsive to a particular level of current through winding 32. The current regulator 13 and motor timer 19 of FIG. 5 are not shown in FIG. 7.

A pulsing switch and a voltage sensor comparable to the pulsing switch 14 and the battery voltage sensor 15 of FIG. 5 are shown in schematic form in FIG. 7. The battery voltage sensor includes Zener diodes 33 and 34 and resistor 35 connected in series directly across the terminals of battery 11. The pulsing switch includes silicon-controlled rectifier 36 having its gate terminal 36a connected to the junction between Zener diode 34 and resistor 35 thereby making it responsive to the voltage-sensing circuit. The pulsing switch further includes a relay winding $W_B$ with its four contacts $B_1$ to $B_4$, with contacts $B_1$ and $B_3$ being normally open and contacts $B_2$ and $B_4$ being normally closed for an unenergized relay. The pulsing switch further includes a relay winding $W_A$ having a normally closed contact $A_1$ and a normally open contact $A_2$. Contact $A_2$ of relay winding $W_A$ corresponds to the load switch 17 of FIG. 5 and is responsive to the battery voltage sensor through the action of silicon-controlled rectifier 36 and relay winding $W_B$. The pulsing switch further includes a capacitor 37 and a series combination of resistor 38 and potentiometer 39, which are connected across the capacitor 37. The capacitor 37 and its parallel circuit of resistor 38 and potentiometer 39 are connected through relay contact $B_3$ and relay winding $W_b$ to silicon-controlled rectifier 36.

Figure 8:
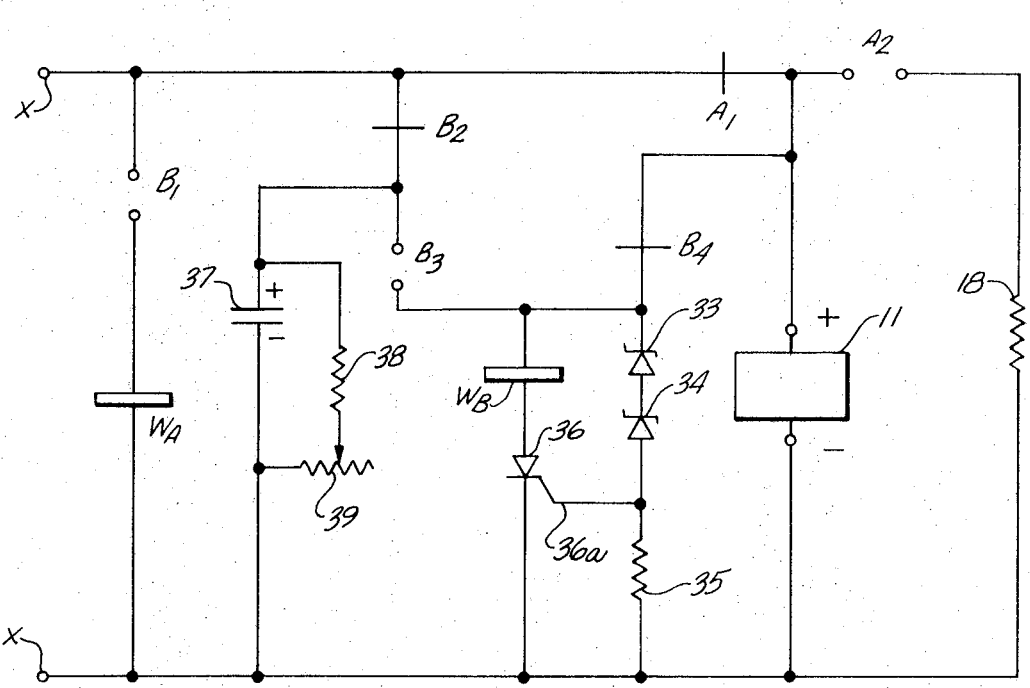
FIGS. 8 and 9 are schematic diagrams of a portion of the battery charger of FIG. 7.

The operation of the charging circuit may be seen more clearly from FIG. 8 which is a schematic diagram of a portion of the circuit FIG. 7. Where the normally open contacts of the relays appear in the circuit the lines are broken to indicate an open circuit.

Upon the application of charging current across the terminals X—X of the circuit of FIG. 8, the current will flow through the normally closed contact $A_1$ to charge the battery 11. As the battery charges its terminal voltage rises and when the selected voltage is reached above which excessive gassing takes place, the pulsing switch of the charger operates to remove the charging current. This is accomplished in the following manner.

The voltage divider circuit or the battery voltage sensor of Zener diodes 33, 34 and resistor 35 is designed so that the Zener diodes break down when the selected terminal voltage of the battery is reached. It will be assumed for purposes of illustration that this voltage is 1.5 volts and that the battery being charged is a type Sub-C cell.

Figure 9:
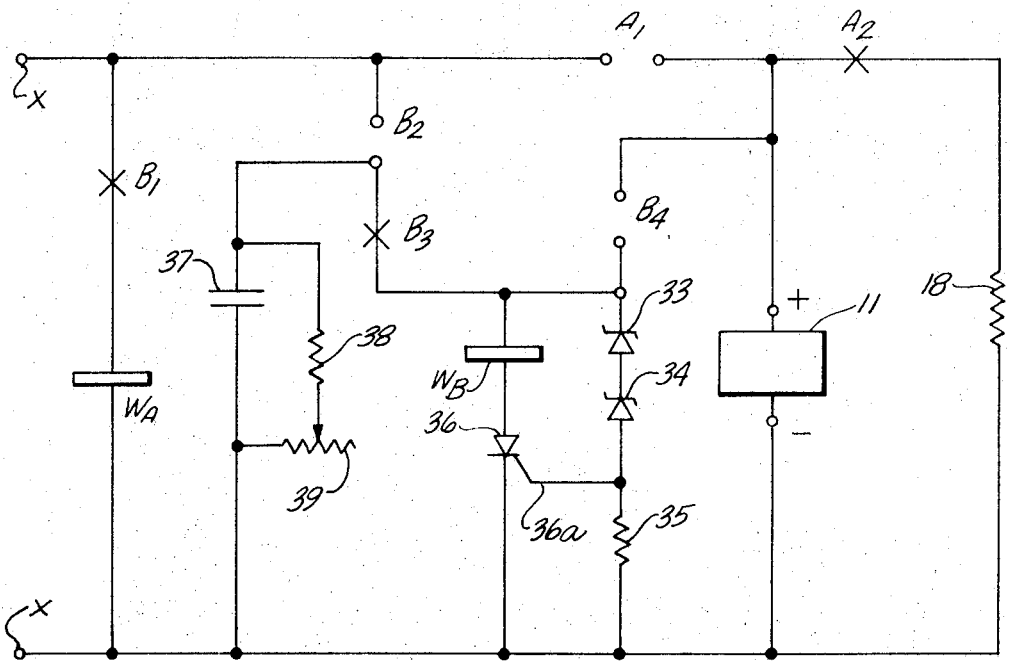

Upon the breaking down of Zener diodes 33 and 34 the voltage is developed across resistor 35 which appears at the gate terminal 36a of silicon-controlled rectifier 36. The silicon-controlled rectifier 36 will fire and current will be conducted through relay winding $W_B$ and silicon-controlled rectifier 36 through the normally closed relay contacts $A_1$ and $B_4$ from the terminals X—X. Current flow through the relay winding $W_B$ will activate this relay to open contacts $B_2$ and $B_4$ and to close the contacts $B_1$ and $B_3$. Upon the closing of contact $B_1$, relay winding $W_A$ is placed directly across the terminals X—X and will thus be activated. The activation or energization of relay winding $W_A$ will open contact $A_1$ and close contact $A_2$. This condition is shown in FIG. 9. Prior to the activation of relay winding $W_B$ the capacitor 37 will charge through the normally closed contact $B_2$. Upon the opening of contact $B_2$ and the closing of contact $B_3$, which condition is shown in FIG. 9, the capacitor 37 will discharge through the resistor 38 and potentiometer 39 and the parallel paths of relay winding $W_B$ and silicon-controlled rectifier 36 and the series combination of Zener diodes 33, 34 and resistor 35. Therefore, by adjusting the resistance in the path of resistors 38 and 39 which are in parallel with the other two paths for the discharge of capacitor 37, the time of discharge is adjustable. Consequently, the period of time that the relay winding $W_B$ remains energized by current flow from the capacitor 37 is dependent upon the length of time it takes for the capacitor 37 to discharge, which time is adjustable.

When the charger is in the condition shown in FIG. 9 the battery 11 will be discharged through the load 18 which is shown as a resistor 18 in FIGS. 7 through 9. It is desired that the battery be discharged for only a short period of time so that the charging pulses can again be applied to further charge the battery.

In particular, it has been found for a type Sub-C cell that a discharge current of 30 amperes for one-half second is appropriate. Therefore, for this type of cell the time constant for discharging of capacitor 37 and the deenergizing of relay winding $W_B$ may be adjusted for the ½-second period. Upon the deenergization of relay winding $W_B$ contacts $B_2$ and $B_4$ will again close and contacts $B_1$ and $B_3$ will open. The opening of contact $B_1$ will deenergize relay winding $W_A$ and the contact $A_1$ will close and the contact $A_2$ will open. This again applies a charging current to the battery to further charge the battery and the circuit condition of FIG. 8 again exists.

As an alternative to a continuous direct current source for supplying the charging current, the charging current may be supplied by a pulsating direct current source as shown in FIG. 10.

In FIG. 10, input terminals 60 and 61 are shown, across which a source of commercial 60-cycle alternating current is connected. A transformer 62 has a primary winding 63 and secondary windings 64, 65, and 66. A switch 67 and primary winding 63 are connected in series between input terminals 60 and 61. Secondary windings 64 and 65 are connected in series. The series combination of the anode-cathode circuit of a silicon-controlled rectifier 70 and a battery 71 to be discharged are coupled across secondary winding 64. The series combination of a resistor 72, a resistor 73 and a diode 74 is coupled across secondary winding 65. Diode 74 is poled to conduct current on the same half-cycles of the alternating current as controlled rectifier 70. (Controlled rectifier 70 is poled to conduct current in the direction in which battery 71 is charged.) A diode 75 and a resistor 76 are connected in series between the anode and control terminal of controlled rectifier 70. Diode 75 is poled to conduct current on the same half-cycles of the alternating current source as controlled rectifier 70. A resistor 77 is coupled between the control terminal and the cathode of controlled rectifier 70. A Zener diode 78 interconnects the junction of resistors 72 and 73 with the junction of resistors 76 and 77. Zener diode 78 is poled such that its Zener breakdown voltage is exceeded as the terminal voltage of battery 71 increases beyond some selected value. Secondary winding 66, a resistor 79 and the anode-to-cathode circuit of a silicon-controlled rectifier 80 are connected in series across the terminals of battery 71. Controlled rectifier 80 is poled in a direction to conduct current produced by battery 71. Resistor 72 is coupled between the control terminal and cathode of controlled rectifier 80.

After switch 67 is closed, alternating current power is coupled across transformer 62 to charge battery 71. A charging current is supplied to battery 71 during the half-cycles of the alternating current in which the end of winding 64 with the polarity dot is positive with respect to the other end, hereinafter designated positive half cycles. At the beginning of the positive half-cycles, controlled rectifier 70 is nonconducting. As the voltage increases above the battery 71 terminal voltage, a small charging current flows to battery 71 terminal voltage, a small charging current flows to battery 71 through diode 75, resistor 76, and resistor 77, and also through the gate to cathode junction of silicon-controlled rectifier 70. As the voltage across secondary winding 64 increases, the charging current also increases until the current through the gate-cathode junction is sufficient to trigger controlled rectifier 70. Controlled rectifier 70 provides the charging current path, essentially short circuiting the current path through diode 75, resistor 76 and resistor 77 as long as the secondary voltage remains above the battery terminal voltage and the rectifier is forward biased. During the opposite or negative half-cycles of the alternating current, the end of secondary winding 64 with the polarity dot is negative in respect to the other end, and controlled rectifier 70 is rendered nonconductive. During the positive half-cycles of the alternating current, the voltage at the end of secondary winding 65 with the polarity dot is also positive with respect to the other end. As a result, a component of current, designated in FIG. 10 as $i_1$, flows through resistor 72, resistor 73 and diode 74. During the negative half-cycles, diode 74 prevents current that would be produced by the secondary voltage from flowing through resistor 72. The current flowing through resistor 72 during positive half-cycles give rise to a voltage across resistor 72 that, together with the terminal voltage battery 71, constitutes the bias applied to Zener diode 78. During any given positive half-cycle, the voltage across resistor 72 due to current component $i_1$ is a maximum at the peak of the positive half cycle, is substantially smaller than the terminal voltage of battery 71, and is substantially larger than the change in terminal voltage of battery 71 during any given positive half-cycle. (Zener diode 78 is selected so its breakdown voltage is not exceeded until the terminal voltage of battery 71 reaches the selected value at which the discharge path is to be applied for discharge to take place.) Consequently, as the terminal voltage of battery 71 rises in the course of the charging operation, Zener diode 78 breaks down substantially at the peak of a positive half-cycle. After Zener diode 78 breaks down, current from battery 71 would flow through resistor 77, Zener diode 78 and resistor 72 but for the path of lesser resistance through resistor 73, diode 74, and winding 65. The component of current from battery 71 that later flows through resistor 72 is designated $i_2$ in FIG. 10. After Zener diode 78 has broken down near the peak of one of the positive half-cycles, the current component $i_1$ due to the voltage across secondary winding 65 decreases as the secondary voltage across winding 65 decreases. The secondary voltage across winding 65 eventually decreases below the voltage presented by battery 71 so that the current component $i_2$ from battery 71 begins to flow. When this occurs, a positive voltage is impressed on the control terminal of controlled rectifier 80 which triggers it into conduction because of the forward anode-cathode bias presented by the battery 71. Thus, a discharge circuit path through secondary winding 66 is applied across battery 71 and battery 71 begins to discharge. The energy released by battery 71 during discharge or depolarization is coupled by secondary winding 66 back to primary winding 63 to the alternating current source. On the negative half-cycles of the alternating current, the end of secondary winding 66 with the polarity dot becomes negative with respect to the other end and controlled rectifier 80 is rendered nonconductive at least as soon as the secondary voltage across winding 66 exceeds the battery terminal voltage. In summary, secondary winding 65 serves to impress a voltage across resistor 72 that controls the point at which Zener diode 78 breaks down after the terminal voltage of battery 71 reaches its selected value, namely, at the peak of the positive half-cycle, and serves to control the application of the discharge path and the commencement of depolarization after the Zener diode 78 has broken down, namely, on the terminal portion of the positive half-cycle after the peak thereof. Secondary winding 66 serves to couple the energy discharged from battery 71 during discharge back to the alternating current source and to stop the discharge of battery 71 after a selected time period.

The application of the discharge path may occur after only a short charge interval upon the initial application of charge current where the cells of the battery have a high internal resistance which may be due to a long period of nonuse. Additionally, the discharge path may be applied earlier and more frequently than in the above example where continuous direct current was employed.

In the circuit arrangement of FIG. 11, many of the components perform the same function as in FIG. 10. These components bear the same reference numerals in FIGS. 10 and 11. The circuit arrangement of FIG. 11 basically charges and discharges the battery in the manner described except that the discharging and, thus the depolarization of battery 71 is initiated responsive to its temperature or internal pressure rather than terminal voltage. For this purpose a bridge circuit 90 is provided. A diode 91 and a capacitor 92 are connected in series across secondary winding 64. Diode 91 is poled so as to conduct currents on positive half-cycles of the alternating current. Resistors 93, 94, 95 and a transducer 96, whose resistance varies as a function of the monitored parameter of battery 71, form the legs of bridge circuit 90. If the internal pressure of battery 71 is monitored, transducer 90 could be a strain gauge attached to the outside of its casing. If the temperature of battery 71 is to be monitored, transducer 96 could be a thermistor attached to the outside of its casing. The junction of resistor 93 and transducer 96 is connected to one end of capacitor 92 and the junction of resistor 94 and resistor 95 is connected to the other end of capacitor 92. End terminals of a potentiometer 97 are connected to the junction of resistor 95 and transducer 96 and the junction of resistor 93 and resistor 94, respectively. The slider arm of potentiometer 97 is coupled through a resistor 98 to the cathode of Zener diode 78. The direct current voltage appearing across capacitor 92 is impressed on the input terminals of circuit 90. As the resistance of transducer 96 rises in the course of the charging operation, the voltage between the slider arm of potentiometer 97 and the negative terminal of battery 71 rises in the same fashion as does the terminal voltage of battery 71 in the arrangement of FIG. 10. The setting of the slider arm of potentiometer 97 is adjusted with respect to the breakdown voltage of Zener diode 78 so that the necessary firing voltage for controlled rectifier 80 appears across resistor 72 when transducer 96 indicates that the selected value of temperature or pressure is reached. Thereafter, controlled rectifier 80 applies a discharge path through winding 66 to depolarize battery 71 and the energy released during depolarization is coupled back to the alternating current source as described in connection with FIG. 10. The circuit arrangement of FIG. 11 incorporates certain safety features.

One of the safety features prevents battery 71 from discharging in the event its terminals are reversed when connecting it to the charging circuit. A circuit breaker 105 is connected in series with secondary winding 64 and the charging circuit. The circuit breaker 105 opens the charge circuit whenever a battery is connected in the circuit backwards. If the battery voltage aids the source voltage across winding 64 excessive current may flow, which current will be sensed by breaker 105 to open the circuit.

Another safety feature is the provision of a normally open relay contact 107 in the discharge path of battery 71. Without the protection afforded by contact 107 the possibility would exist that a permanent discharge path through secondary winding 66, resistor 79 and controlled rectifier 80 would exist for battery 71 in the event of power failure while controlled rectifier 80 is conductive. Such a power failure would prevent the negative half-cycles of alternating current from rendering controlled rectifier 80 nonconductive after the discharge interval. As long as alternating current power is supplied to the charging circuit in a normal manner, capacitor 92 is fully charged. A relay winding 108 which controls contact 107 and a current-limiting resistor 109 are connected in series across capacitor 92. Therefore, winding 108 remains energized as long as power is being provided to the charging circuit. Whenever a power failure occurs, capacitor 92 discharges and winding 108 is deenergized to open contact 107 and prevent further discharge of battery 71.

What is claimed is:

1. A method of rapid charging batteries having one or more cells comprising the steps of applying a charging current at the maximum possible rate permitted by the size, structure, and materials of the battery whereby the parameters of terminal voltage, pressure and temperature of the battery change; sensing the change in one of the parameters; interrupting the charging current in response to the occurrence of a critical valve in the sensed parameter; depolarizing the electrodes of the battery by discharging at a high rate and repeating the above steps.

2. A method of rapid charging batteries having one or more cells comprising the steps of applying a charging current in excess of the nominal 1-hour rate of the cells of the battery whereby the parameters of terminal voltage, pressure and temperature of the battery change; sensing the change in one of the parameters; applying a discharge path in response to the occurrence of a selected value in the sensed parameter; and repeating the above steps to effect charging.

3. A method of rapid charging batteries having one or more cells comprising the steps of applying a charging current at a rate in excess of the nominal 1-hour rate of the cells of the battery whereby the parameters of terminal voltage, pressure and temperature of the battery change; sensing the change in one of the parameters; discharging the battery in response to the occurrence of a selected value in the sensed parameter; and repeating the above steps to effect charging.

4. A method in accordance with claim 3 wherein the sensed parameter is the battery terminal voltage.

5. A method in accordance with claim 4 wherein the terminal voltage on open circuit is sensed.

6. A method in accordance with claim 4 wherein the terminal voltage while the charge current is applied is sensed.

7. A method of rapid charging batteries having one or more cells comprising the steps of applying a charging current at a rate in excess of the nominal 1-hour rate of the cells of the battery whereby the parameters of terminal voltage, pressure and temperature of the battery change; sensing the change in one of the parameters; depolarizing the battery in response to the occurrence of a selected value in the sensed parameter; and repeating the above steps to effect charging.

8. A method of rapid charging batteries having one or more cells comprising the steps of applying a charging current in excess of the nominal one-hour rate of the cells of the battery and intermittently interrupting the application of charging current and discharging at a high rate with the interruptions and discharging becoming more frequent with time.

9. A method of rapid charging batteries having one or more cells to impose an increasing charge on the battery comprising the steps of applying a charging current in excess of the nominal 1-hour rate of the cells of the battery and intermittently discharging at a rate in excess of the nominal 1-hour rate with the discharging becoming more frequent with time.

10. A method of rapidly charging a battery having one or more cells comprising the steps of alternately charging and discharging a battery to attain an increasing charge on the battery; and effecting said charging with charge current exceeding the nominal 1-hour rate of the cells battery.

11. A method of rapidly charging a battery having one or more cells comprising the steps of alternately charging and discharging a battery to attain an increasing charge on the battery and effecting said charging with charge current in excess of five times the nominal 1-hour rate of the cells of the battery.

12. A method of rapidly charging a battery having one or more cells comprising the steps of alternately charging and discharging a battery to attain an increasing charge on the battery and effecting said charging with charge current in excess of five times the nominal 1-hour rate of the cells of the battery.

13. A method of rapidly charging a battery having one or more cells comprising the steps of alternately charging and discharging a battery until the battery is charged to its effective capacity and effecting said charging with charge current exceeding the nominal 1-hour rate of the cells of the battery.

14. A method of rapidly charging a battery having one or more cells comprising the steps of alternately charging and discharging a battery until the battery is charged to at least 95 percent of its effective capacity and effecting said charging with charge current exceeding the nominal 1-hour rate of the cells of the battery.

15. A method of rapidly charging a battery having one or more cells comprising the steps of alternately charging and discharging a battery until the battery is charged to its effective capacity effecting said charging with charge current in excess of twice the nominal 1-hour rate of the cells of the battery 16. A method of rapidly charging a battery having one or more cells comprising the steps of alternately charging and discharging a battery until the battery is charged to its effective capacity and effecting said charging with charge current in excess of five times the nominal 1-hour rate of the cells of the battery.

17. A method of rapidly charging a battery having one or more cells comprising the steps alternately charging and discharging a battery until the battery is charged to at least 95 percent of its effective capacity and effecting said charging with charge current in excess of twice the nominal 1-hour rate of the cells of the battery.

18. A method of rapidly charging a battery having one or more cells comprising the steps of alternately charging and discharging a battery until the battery is charged to at least 95 percent of its effective capacity and effecting said charging with charge current in excess of five times the nominal 1-hour rate of the cells of the battery.

19. An apparatus for rapid charging a battery having one or more cells comprising a direct current source for supplying charging current in excess of the nominal one-hour rate of the cells of the battery coupled to a battery to be charged, means connected across the battery for sensing the terminal voltage, means connected between the source and the battery responsive to the sensing means for intermittently interrupting the charging current to the battery for limited intervals of time, and means for intermittently discharging the battery during said interval of time.

20. An apparatus for rapid charging a battery in accordance with claim 19 wherein the apparatus includes a load, and means responsive to said terminal voltage sensing means for simultaneously interrupting charging current and applying said load across the battery.

21. An apparatus for rapid charging a battery in accordance with claim 19 wherein the apparatus includes a load, and means responsive to said terminal voltage-sensing means for simultaneously interrupting charging current and applying said load across said battery and for simultaneously reapplying charging current and removing the load after a selected period of time.

22. An apparatus for rapid charging a battery in accordance with claim 19 wherein the apparatus includes a load and means for selectively applying the load across said battery.

23. An apparatus for rapid charging a battery having one or more cells comprising a direct current source for supplying charging current in excess of the nominal 1-hour rate of the cells of the battery coupled to the battery to be charged, means associated with the battery for sensing the change in one of the parameters of the battery that varies during the application of charging current, and means responsive to the sensing means for applying a discharge path across the battery for an interval of time.

24. An apparatus in accordance with claim 23 wherein the direct current source comprises an alternating current source and at least one rectifier connected across the output of the alternating current source to produce a pulsating direct current voltage/

25. A battery-charging circuit comprising a source of charging current greater than the nominal 1-hour rate of a battery; a load; and circuit means for alternately connecting said source and said load to said battery to impose on an increasing charge on said battery.

26. A method of charging batteries having one or more cells comprising the steps of applying a charging current to the battery whereby the parameters of terminal voltage, temperature, and pressure of the battery change; sensing the change in one of the parameters; and intermittently, in response to the attainment of a selected value of the sensed parameter, depolarizing the battery by reversing the current through the battery.

27. A method in accordance with claim 1 wherein the cells of the battery are sealed cells.

28. A method in accordance with claim 1 wherein the cells of the battery are nickel cadmium cells.

29. A method in accordance with claim 1 wherein the cells of the battery are alkaline cells.

30. A method of charging batteries having one or more cells comprising the steps of applying a charging current to the battery whereby the parameters of terminal voltage, temperature, and pressure of the battery change; sensing the change in one of the parameters; and intermittently, in response to the attainment of a selected value of the sensed parameter, depolarizing the battery by reversing the current through the battery for a selected period of time.

31. A method of charging batteries having one or more cells comprising the steps of applying a charging current to the battery whereby the parameters of terminal voltage, pressure, and temperature of the battery change; sensing the change in one of the parameters; and intermittently, in response to the attainment of a selected value of the sensed parameter, removing the detrimental polarization effects of charging by reversing the current through the battery.

32. A method of rapid charging batteries having one or more cells comprising the steps of applying charging current pulses having a first repetition rate and applying a discharge path to the battery between charge pulses at a second repetition rate that is less than the first rate.

33. A method of rapid charging batteries having one or more cells comprising the steps of charging the battery with direct current pulses at a first repetition rate and polarizing the battery between charging current pulses at a second repetition rate that is less than the first rate.

PO-1050
(5/69)

UNITED STATES PATENT OFFICE
CERTIFICATE OF CORRECTION

Patent No. 3,614,583         Dated   October 19, 1971

Inventor(s)   Wilford B. Burkett and Robert V. Jackson

It is certified that error appears in the above-identified patent and that said Letters Patent are hereby corrected as shown below:

Col. 1, line 6, after "Batteries"", insert --, now U. S. Patent 3,517,293, issued June 23, 1970--.
Col. 1, lines 9 and 10, delete ", now U.S. Pat. No. 3,517,293,".
Col. 2, line 67, change "wit" to --with--.
Col. 3, line 38, after "time" change "that" to --than--.
Col. 3, line 44, change "is" to --its--.
Col. 4, line 49, change "started" to --starts--.
Col. 5, line 30, change "tat" to --that--.
Col. 6, line 60, change "B₂" to --B₁--.
Col. 7, line 75, change "discharged" to --charged--.
Col. 8, line 57, after "voltage" insert --of--.
Col. 9, line 39, after "was employed." insert --When half wave rectification is employed as in FIG. 10, the charge current pulses will have a repetition rate of sixty times per second and a charge interval will contain many pulses of charge current at this fixed repetition rate. Each time the predetermined battery terminal voltage is reached during a charge interval the discharge path is applied. The application of the discharge path occurs at a repetition rate that is less than the repetition rate of the charge current pulses because it takes many charge current pulses to reach the selected battery terminal voltage at which the discharge path is applied.--.
Col. 9, line 44, after "battery" insert --71--.
Col. 9, line 54, after "could" insert --, for example--.
Col. 9, line 56, after "could" insert --, for example--.
Col. 10, line 44, change "valve" to --value--.
Col. 11, line 19, after "cells" insert --of said--.
Col. 11, line 24, change "five times" to --twice--.
Col. 12, line 29, after "voltage" change "/" to a period.
Col. 12, line 44, change "1" to --26--.
Col. 12, line 46, change "1" to --26--.
Col. 12, line 48, change "1" to --26--.
Col. 12, line 73, change "polarizing" to --depolarizing--.

Signed and sealed this 23rd day of May 1972.

(SEAL)
Attest:

EDWARD M. FLETCHER, JR.                ROBERT GOTTSCHALK
Attesting Officer                       Commissioner of Patents